Jan. 28, 1941.    P. H. RAVEN    2,230,014
TRAILER
Filed March 6, 1940    2 Sheets-Sheet 2
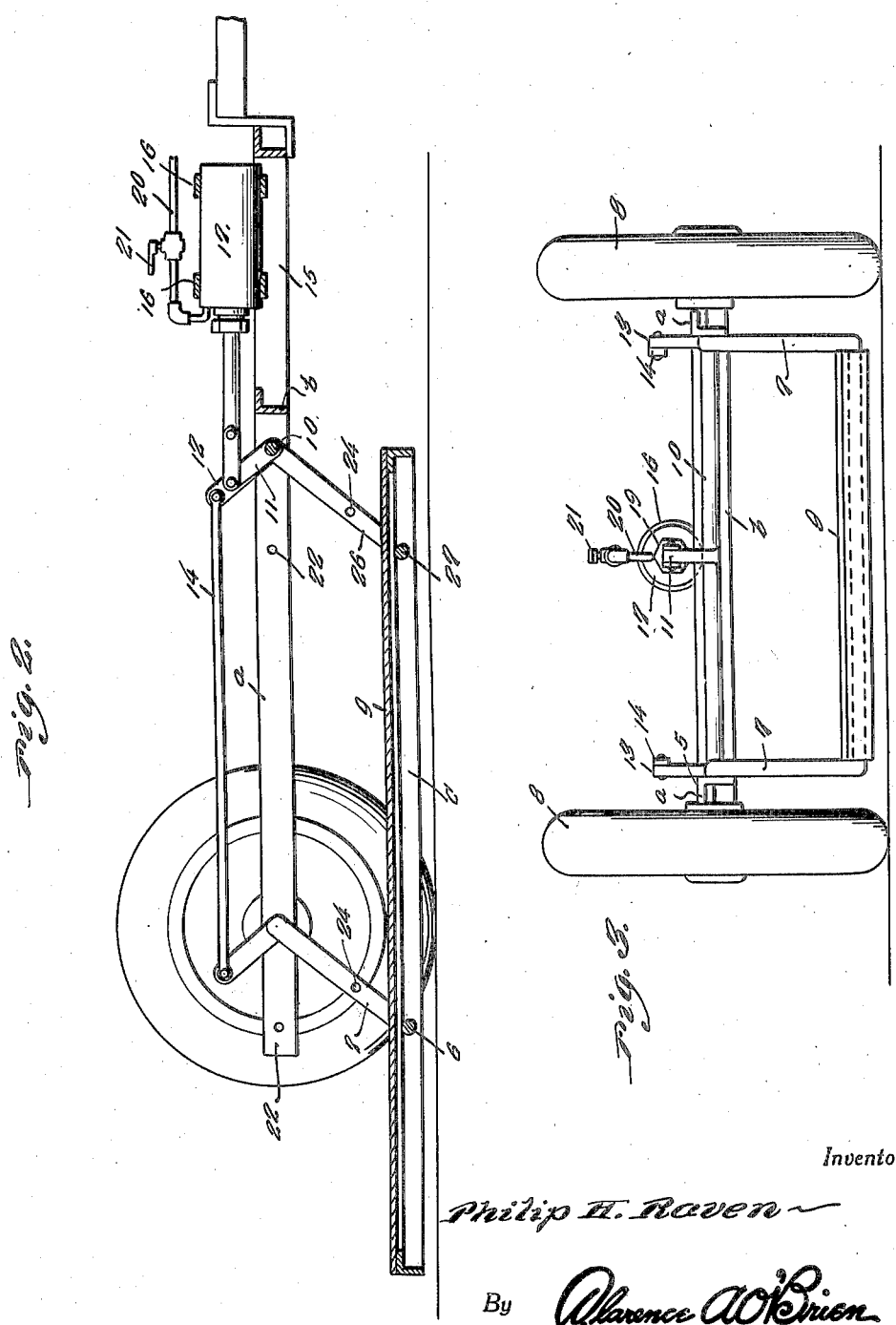
Inventor
Philip H. Raven
By Clarence A. O'Brien
and Hyman Berman
Attorneys Patented Jan. 28, 1941

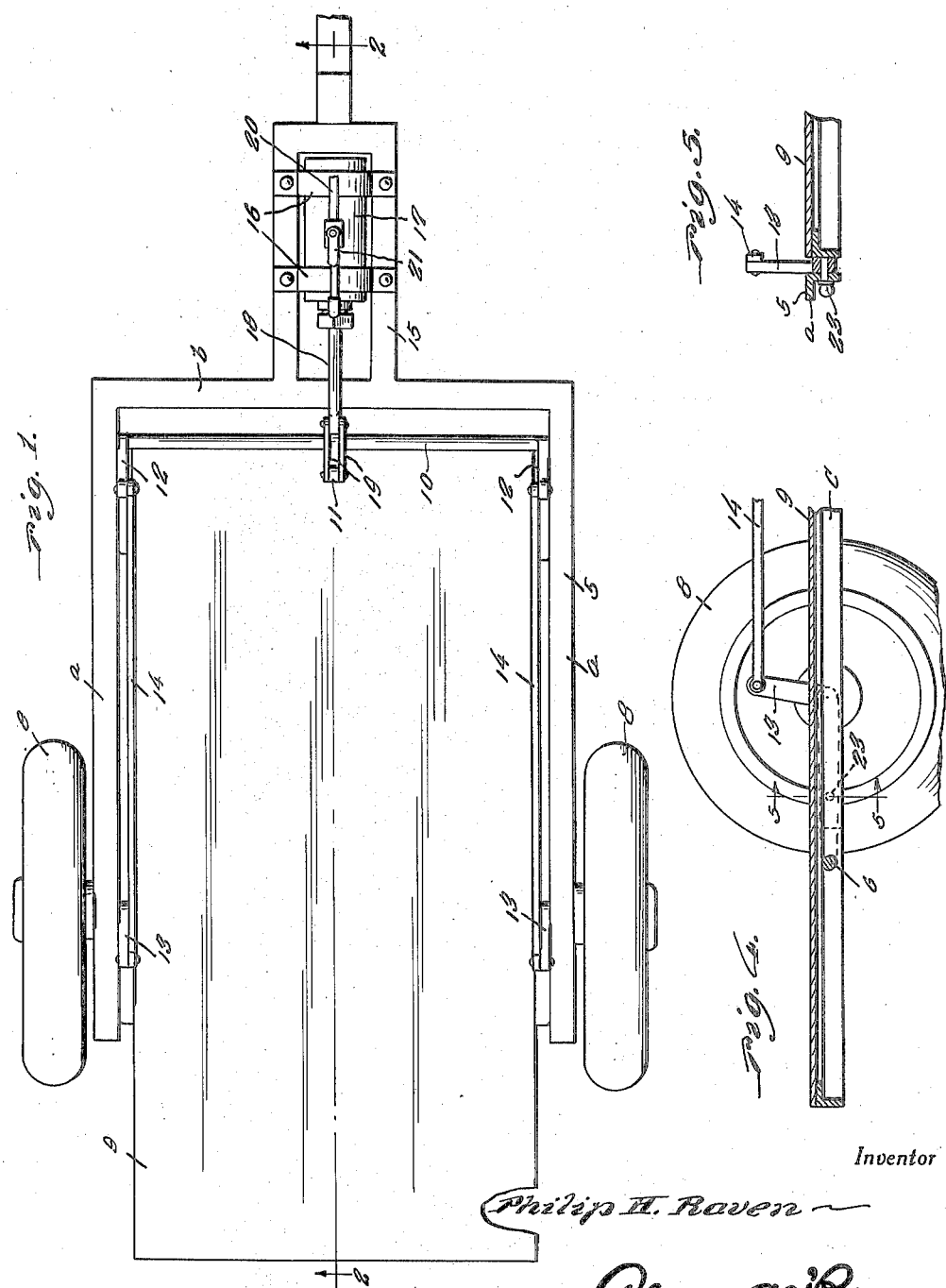

2,230,014

UNITED STATES PATENT OFFICE 2,230,014

TRAILER

Phillip H. Raven, Goshen, Calif.

Application March 6, 1940, Serial No. 322,616

6 Claims. (Cl. 254—8)

This invention appertains to new and useful improvements in trailers and more particularly to trailers of the vertically movable bed type.

The principal object of the present invention is to provide a trailer which can be raised or lowered with respect to the ground in a quick and convenient manner.

Another important object of the invention is to provide a trailer having a vertically adjustable bed which can be lowered to a point in close proximity with the ground for conveniently taking on loads.

Still another important object of the invention is to provide a trailer wherein the parts are of simple construction and of low cost to manufacture.

These and other important objects and advantages of the invention will become apparent to the reader of the following specification.

In the drawings:

Figure 1 represents a top plan view of the trailer.

Figure 2 is a longitudinal sectional view on the line 2—2 of Figure 1.

Figure 3 is a rear elevational view.

Figure 4 is a fragmentary longitudinal sectional view through the rear portion of the trailer showing the bed in elevated position.

Figure 5 is a fragmentary detailed sectional view on the line 5—5 of Figure 4.

Referring to the drawings wherein like numerals designate like parts, it can be seen that the trailer includes a U-shaped horizontally disposed frame 5 made up of the side members a—a and the forward connecting member b.

Numeral 6 denotes the crank including the crank arms 7 and from the ends of which extend the stub axles on which are the ground engaging wheels 8. The crank 6 is disposed through the depending side flanges c of the trailer bed 9.

A shaft 10 has its ends journaled through the forward ends of the side members a of the U-shaped frame 5 and extending upwardly from the intermediate portion of this shaft 10 is the arm 11. From each end portion of the shaft 10 rises an arm 12 and connecting the arms 12 with the arms 13 on the ends of the crankshaft 6 are the connecting rods 14.

A narrow rectangular-shaped frame 15 extends forwardly from the cross bar b of the frame 5 and has mounted therein by straps 16, a compressed air or hydraulic cylinder 17, the same containing a piston therein (not shown) from which the connecting rod 18 extends and connects by the links 19 to the aforementioned arm 11. A line 20 from a suitable hydraulic or compressed air source extends to the cylinder 17 and has the control valve 21 therein.

As shown in Figure 2, the side members a of the frame 5 have openings 22 therein through which pins 23 can be disposed and engaged into the openings 24 of the crank arms 26 and 7. The crank arms 26 are bridged by the crank bar 27 which extends through the depending flanges c of the bed 9.

It can now be seen that by removing the pins 23, the bed 9 can be lowered to a point adjacent the ground.

To lift the bed, the cylinder 17 is charged, retracting the connecting rod 18. This swings the cranks 6 and 27 upwardly carrying with it the bed 9 and when the openings 22 and 24 are registering, the pins 23 can be driven into place to hold the bed in proper elevated position.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A trailer comprising a frame, a pair of crankshafts carried by the frame, one of the crankshafts having ground engaging wheels on the ends thereof, a trailer bed carried by the crank portions of the shafts, connecting means between the crankshafts, and fluid pressure means for operating the said cranks in unison.

2. A trailer comprising a frame, a pair of crankshafts carried by the frame, one of the crankshafts having ground engaging wheels on the ends thereof, a trailer bed carried by the crank portions of the shafts, connecting means between the crankshafts, and fluid pressure means for operating the said cranks in unison, and detent means for holding the bed in elevated position independent of the said fluid pressure means.

3. A trailer comprising a frame including a pair of side members, wheels for the frame, a crankshaft operative between the side members of the frame, a trailer bed supported by the crankshaft and being adapted by motion of the crankshaft to be lowered from a position substantially on the same plane with the side members of the frame to a position adjacent the ground.

4. A trailer comprising a frame including a pair of side members, wheels for the frame, a crankshaft operative between the side members of the frame, a trailer bed supported by the crankshaft and being adapted by motion of the crankshaft to be lowered from a position substantially on the same plane with the side members of the frame to a position adjacent the ground, said wheels being on the ends of the crankshaft.

5. A trailer comprising a frame including a pair of side members, wheels for the frame, a crankshaft operative between the side members of the frame, a trailer bed supported by the crankshaft and being adapted by motion of the crankshaft to be lowered from a position substantially on the same plane with the side members of the frame to a position adjacent the ground, and a second crankshaft having its intermediate portion disposed in supporting relation with respect to the bed, said crankshafts having levers, means interconnecting the levers, and drive means connected with one of the levers.

6. A vehicle of the character described comprising a frame, wheels for the frame, a crankshaft supported by the frame, a vehicle body carried by the crank portion of the crankshaft, said crank portion of the crankshaft being operative between side portions of the frame and being adapted to lower the body from an elevated position immediately adjacent the ground.

PHILLIP H. RAVEN.